United States Patent Office 3,534,179
Patented Oct. 13, 1970

3,534,179
ELECTROLUMINESCENT DIODE HAVING A LIMITED JUNCTION AREA AND A PHOTOGRAPHIC DEVICE UTILIZING THE SAME
Paul L. Vitkus, Bedford, Mass., assignor to National Research Corporation, Newton Highlands, Mass., a corporation of Massachusetts
Filed June 9, 1967, Ser. No. 644,922
Int. Cl. G01d 9/42; G11b 7/12; H05b 33/16
U.S. Cl. 179—100.3                    5 Claims

ABSTRACT OF THE DISCLOSURE

An electroluminescent p-n junction diode is formed of a relatively transparent portion of one impurity type and a relatively opaque portion of the opposite impurity type. The diode generates light near the plane of the junction and has a light-transmitting face which extends generally normal to the p-n junction. The maximum extent of the junction, as measured away from and generally normal to the light-transmitting face, is less than 3 mils.

---

The present invention relates to electroluminescent diodes and more particularly to electroluminescent diodes emitting a very narrow beam of light particularly useful for recording high density of data on photographic film. In order to record a large amount of data on a photographic film, such as in recording high frequency sound, computer data, image reconstruction and the light, it is important that the light emitted from the light source be very narrow in the direction of relative movement between the light source and the film. In the past the various optical systems, such as masks and the like, have been utilized for narrowing the light from the source. While an important advance has been made by the use of electroluminescent diode having a peaked output as described in pending application Ser. No. 603,853, filed Dec. 22, 1966, there are some applications where even sharper output of light than that described in the above-mentioned copending application may be desired. This is particularly true for recording high frequency sound on motion picture film.

Accordingly, it is a principal object of the present invention to provide an improved electroluminescent p-n junction diode having a very narrow beam of emitted light.

Still another object of the invention is to provide improved methods of manufacturing such a diode.

Still another object is to provide an improved camera employing such a diode.

These and other objects of the invention will be obvious and will in part appear hereinafter.

Figure 1:
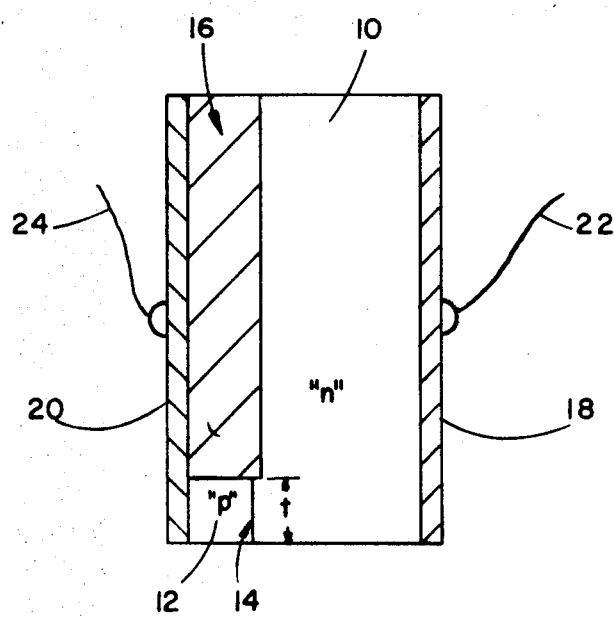
Figure 4:
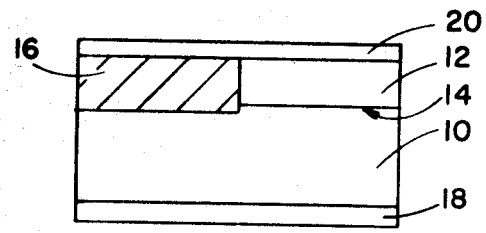
Figure 5:
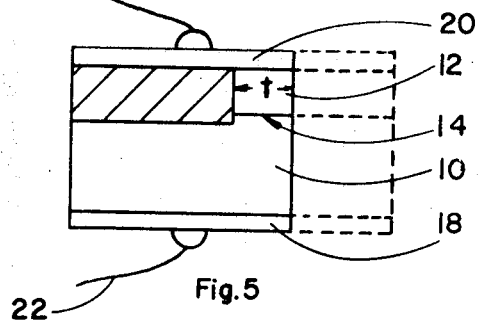
Figure 6:
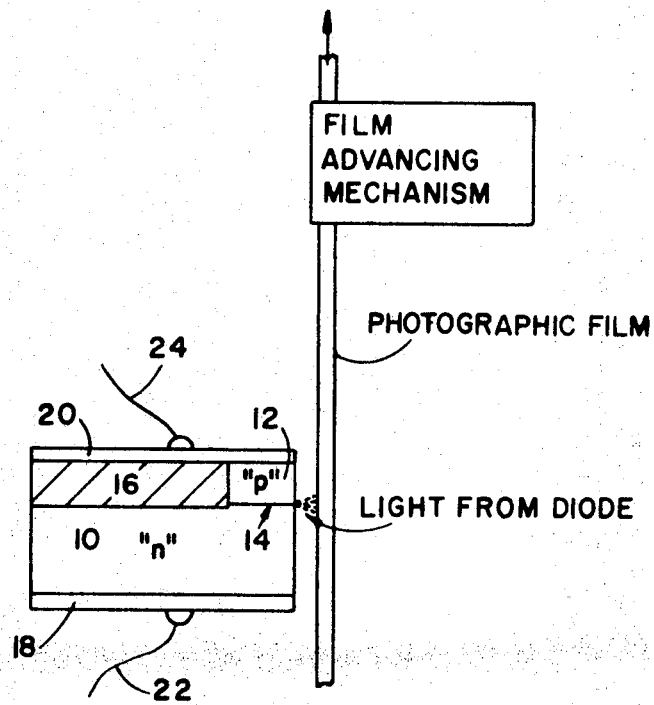

For a fuller understanding of the nature and objects of the invention, reference should be had to the following detailed discussion thereof taken in connection with the accompanying drawings in which FIG. 1 is a diagrammatic, schematic illustration of one preferred diode of the present invention;

FIG. 2 through FIG. 5 show various steps in the manufacture of the diode of FIG. 1; and FIG. 6 is a diagrammatic, schematic illustration of the diode of FIG. 1 as used in a motion picture camera.

In the present invention, an electroluminescent p-n junction diode is formed of a relatively transparent portion of one impurity type and a relatively opaque material of the opposite impurity type. In a preferred embodiment of the invention, the diode is formed of silicon carbide having a relatively transparent n region and a relatively opaque p region epitaxially grown thereon as described in copending application Ser. No. 545,751, filed Apr. 27, 1966, now abandoned. This diode has a light-emitting region substantially at the p-n junction, although it might be slightly displaced into the n region. The diode has a light-transmitting face which is preferably substantially normal to the plane of the p-n junction and which is adapted to be positioned immediately adjacent the photosensitive surface for recording high density signals in the photosensitive material. By limiting the maximum extent of the junction, as measured away from and generally normal to the light-transmitting face, to a dimension less than about 3 mils, the light emitted from the junction is extremely narrow, on the order of less than 1 mil in width, as seen by a photosensitive film position about ½ mil from the light-transmitting face.

Referring now to the drawings, there is shown in FIG. 1 a preferred electroluminescent diode comprising a base crystal 10 of n material having a regrown portion 12 of p material, these defining the junction indicated at 14. This diode is preferably formed as described in the above-mentioned application Ser. No. 545,751, now abandoned. Most of the p material has been ground away, the grinding being extended beyond the junction. This removed p material has been replaced, for structural reasons, by an insulating material such as an epoxy resin shown at 16. Metallic contacts 18 and 20 are applied to the p and n materials such as by sputtering and contact wires 22 and 24 are suitably soldered to the contacts.

Figure 2:
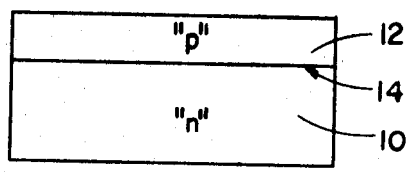

The various steps of manufacturing the diode are shown in FIGS. 2 through 5. The starting grown diode is shown at FIG. 2 as comprising the n and p layers 10 and 12, respectively. In a preferred embodiment of the invention, the n layer is relatively transparent having an absorption coefficient less than 100 cm.$^{-1}$; the p layer is relatively opaque having an absorption coefficient in excess of 200 cm.$^{-1}$. In a preferred embodiment of the invention, the absorption coefficient of the n layer is on the order of 5 cm.$^{-1}$ and the absorption coefficient of the p layer is on the order of 300 cm.$^{-1}$.

Figure 3:
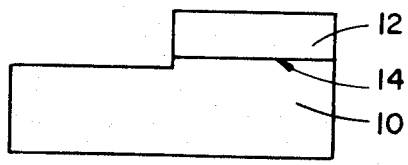

In FIG. 3, about one-half of the p layer 12 has been ground away, the grinding extending down through the junction 14 into the n layer 10.

In FIG. 4, the removed section has been replaced by a suitable insulating layer such as an epoxy resin shown at 16. Gold contacts 18 and 20 have also been sputtered onto the top and bottom surfaces of the crystal. In FIG. 5 most of the righthand section of the diode is ground away until the thickness of the p-n junction 14 (indicated as $t$ in FIG. 5) is less than about 3 mils, this being preferably on the order of 2 mils. The removed portion of the diode is shown in dotted lines. A practical means of measuring the dimension $t$ is by measuring the increasing resistance across the p-n junction during the grinding operation, this resistance being inversely proportional to dimension $t$. FIG. 5 also shows the lead wires 22 and 24 soldered in place on the sputtered contacts 18 and 20, respectively.

In FIG. 6, there is shown a schematic, diagrammatic representation of the diode mounted adjacent to the photographic film for recording data, such as a sound track on a sound motion picture film. This same arrangement can be employed in a motion picture projector to provide a sound signal in accordance with an optical sound track on the motion picture film. In this case, the diode is run at constant current and a photosensitive cell (not shown) on the opposite side of the film from the diode converts the film-modulated light output to an electrical signal.

While the invention has been particularly described in conjunction with silicon carbide and the preferred embodiment where the p layer is the opaque layer, it can also be employed with a relatively transparent p layer and an opaque n layer. Equally, it can be utilized with other electroluminescent materials, such as gallium phosphide and gallium arsenide phosphide where one of the layers forming the p-n junction is relatively opaque with respect to the other and the thickness of the junction, as measured from the light-transmitting face is less than about 3 mils.

Since certain changes can be made in the above apparatus, product and process without departing from the scope of the invention herein involved, it is intended that all matter contained in the above description shall be interpreted as illustrative and not in a limiting sense.

What is claimed is:

1. An electroluminescent p-n junction diode formed of a relatively transparent portion of one impurity type and a relatively opaque portion of the opposite impurity type, the diode generating the light near the plane of the junction and having a light-transmitting face which extends generally normal to the p-n junction, the maximum extent of the junction, as measured away from and generally normal to the face, being less than 3 mils.

2. The product of claim 1 wherein the diode is formed of silicon carbide and the relatively transparent layer contains an n type impurity.

3. A photographic device comprising means for creating relative motion between a photographic film and a light source, said light source comprising an electroluminescent p-n junction diode formed of a relatively transparent portion of one impurity type and a relatively opaque portion of the opposite impurity type, the diode generating light near the plane of the junction and having a light-transmitting face which extends generally normal to the p-n junction, the maximum extent of the junction, as measured away from the face, being less than 3 mils, the edge of the junction being less than .001 inch from the film.

4. The device of claim 3 wherein the photographic film is unexposed and the diode is arranged to be modulated to record data such as a sound track on the film.

5. The device of claim 3 wherein the photographic film is developed and the device includes a photosensitive means for detecting light emitted by the diode and modulated by passing through the developed film.

References Cited

UNITED STATES PATENTS

| | | |
|---|---|---|
| 2,776,367 | 1/1957 | Lehovec. |
| 3,353,051 | 11/1967 | Barrett et al. _____ 313—113 |
| 3,377,210 | 4/1968 | Sommerville et al. ____ 148—1.5 |

FOREIGN PATENTS

| | | |
|---|---|---|
| 263,181 | 9/1927 | Great Britain. |

BERNARD KONICK, Primary Examiner

R. F. CARDILL, Jr., Assistant Examiner

U.S. Cl. X.R.

148—175; 313—108; 317—234; 346—107

UNITED STATES PATENT OFFICE
CERTIFICATE OF CORRECTION

Patent No. 3,534,179                          October 13, 1970

Paul L. Vitkus

It is certified that error appears in the above identified patent and that said Letters Patent are hereby corrected as shown below:

In the heading to the printed specification, lines 5 to 7, "assignor to National Research Corporation, Newton Highlands, Mass., a corporation of Massachusetts" should read -- assignor, by mesne assignments, to Norton Research Corporation --.

Signed and sealed this 6th day of April 1971.

(SEAL)
Attest:

EDWARD M. FLETCHER, JR.                    WILLIAM E. SCHUYLER, JR.
Attesting Officer                             Commissioner of Patents